(12) United States Patent
Lopez

(10) Patent No.: US 11,567,992 B2
(45) Date of Patent: Jan. 31, 2023

(54) SYSTEM AND METHOD FOR GENERATING A VIDEO

(71) Applicant: Camilo Lopez, Miami, FL (US)

(72) Inventor: Camilo Lopez, Miami, FL (US)

(*) Notice: Subject to any disclaimer, the term of this patent is extended or adjusted under 35 U.S.C. 154(b) by 63 days.

(21) Appl. No.: 17/024,510

(22) Filed: Sep. 17, 2020

(65) Prior Publication Data

US 2021/0081450 A1  Mar. 18, 2021

Related U.S. Application Data

(60) Provisional application No. 62/901,867, filed on Sep. 18, 2019.

(51) Int. Cl.

| | | |
|---|---|---|
| *G11B 27/00* | (2006.01) | |
| *H04N 5/76* | (2006.01) | |
| *G06F 16/738* | (2019.01) | |
| *H04N 5/265* | (2006.01) | |
| *H04N 5/232* | (2006.01) | |
| *G06Q 50/16* | (2012.01) | |

(52) U.S. Cl.
CPC ........... *G06F 16/739* (2019.01); *G06Q 50/16* (2013.01); *H04N 5/232935* (2018.08); *H04N 5/265* (2013.01)

(58) Field of Classification Search
USPC ........................................................ 386/290
See application file for complete search history.

(56) References Cited

U.S. PATENT DOCUMENTS

| | | | | |
|---|---|---|---|---|
| 7,746,343 B1* | 6/2010 | Charaniya | ........... | G06F 16/9537 |
| | | | | 345/428 |
| 7,978,219 B1* | 7/2011 | Imes | .................. | H04N 5/23206 |
| | | | | 348/207.99 |
| 8,219,558 B1* | 7/2012 | Trandal | .................. | G06Q 50/16 |
| | | | | 707/736 |
| 9,342,229 B2* | 5/2016 | Billgren | ................ | G06F 16/638 |
| 9,530,452 B2* | 12/2016 | McIntosh | ................. | H04N 5/04 |
| 9,836,885 B1* | 12/2017 | Eraker | ................ | G06F 3/04842 |
| 10,021,295 B1* | 7/2018 | Baldwin | .......... | H04N 5/232935 |
| 10,592,973 B1* | 3/2020 | Eraker | .................. | G06F 16/951 |
| 2002/0091991 A1* | 7/2002 | Castro | ....................... | G06F 9/06 |
| | | | | 717/106 |
| 2004/0098269 A1* | 5/2004 | Wise | ...................... | G06Q 30/02 |
| | | | | 705/313 |
| 2005/0228683 A1* | 10/2005 | Saylor | ..................... | G06Q 10/10 |
| | | | | 705/1.1 |
| 2008/0033847 A1* | 2/2008 | McIntosh | ............. | G06Q 10/087 |
| | | | | 705/28 |
| 2012/0095817 A1* | 4/2012 | Kamil | ................ | G06Q 30/0241 |
| | | | | 715/202 |

(Continued)

OTHER PUBLICATIONS

ISR/PCT/US2020/051312; Jan. 27, 2021.

*Primary Examiner* — Nigar Chowdhury
(74) *Attorney, Agent, or Firm* — AKC Patents, LLC; Aliki K. Collins

(57) ABSTRACT

A system and method for capturing a plurality of videos and images with a camera of a mobile communication device, editing them and combining them in order to generate a video. The invention provides an application for capturing, editing and combining a plurality of videos and images of a real estate structure with the build-in camera of a mobile communication device and then generating a real estate video for a specific real estate listing.

23 Claims, 22 Drawing Sheets

(56) References Cited

U.S. PATENT DOCUMENTS

| | | | |
|---|---|---|---|
| 2013/0182108 A1* | 7/2013 | Meadow | G06F 16/9537 |
| | | | 348/143 |
| 2015/0239264 A1* | 8/2015 | Ishizuka | B41J 2/01 |
| | | | 347/102 |
| 2015/0310523 A1* | 10/2015 | Silvernail | G06Q 30/0623 |
| | | | 705/313 |
| 2016/0093007 A1* | 3/2016 | Richardson | G06Q 30/0611 |
| | | | 705/26.4 |
| 2016/0284123 A1* | 9/2016 | Hare | G06T 7/55 |
| 2017/0134815 A1* | 5/2017 | Crefeld | H04N 21/47815 |
| 2017/0357563 A1* | 12/2017 | Shah | G06F 16/90339 |
| 2018/0174619 A1* | 6/2018 | Roy | H04N 21/816 |
| 2019/0065614 A1* | 2/2019 | Bilsten | G06Q 10/10 |
| 2019/0156784 A1* | 5/2019 | Kasahara | H04N 7/14 |
| 2019/0304039 A1* | 10/2019 | Wickersham | G06Q 50/16 |
| 2021/0176325 A1* | 6/2021 | McNeill | H04L 67/26 |

* cited by examiner

SYSTEM AND METHOD FOR GENERATING A VIDEO

CROSS REFERENCE TO RELATED CO-PENDING APPLICATIONS

This application claims the benefit of U.S. provisional application Ser. No. 62/901,867 filed on Sep. 18, 2019 and entitled SYSTEM AND METHOD FOR GENERATING A VIDEO, which is commonly assigned and the contents of which are expressly incorporated herein by reference.

FIELD OF THE INVENTION

The present invention relates to a system and a method for generating a video and more particularly, to a system and method for capturing a plurality of videos and images of an object with a camera of a mobile communication device, editing them and combining them in order to generate a video.

BACKGROUND OF THE INVENTION

There are several video capturing and editing systems that use a series of steps to capture a plurality of videos and then generate a composite video by joining them together. Mobile phones equipped with high resolution cameras are frequently used for video capturing. Computer-based video editing systems, such as iMovie, allow users to easily join, edit and revise the videos. However, they still require human intervention for each editing decision.

Accordingly, there is still a need for a video capturing and editing system that is easy to use without the need of human intervention.

SUMMARY OF THE INVENTION

The invention provides a system and method for capturing a plurality of videos and images of an object with a camera of a mobile communication device, editing them and combining them in order to generate a video.

In general, in one aspect the invention provides a computer-implemented method for generating a video for a real estate listing including the following. First, providing a real estate listing having at least a first space. Next, providing a mobile communication device comprising a camera, a display, a central processing unit (CPU), a video generating application and a memory. Next, starting the video generating application and then opening the camera and providing camera tutorials. The camera tutorials comprise instructions for camera positioning, camera moving, and camera aligning while taking videos. Next, taking videos of the first space following the instructions for camera positioning, camera moving, and camera aligning while taking videos. Next, uploading the videos to the memory, editing the videos and producing a composite video for the real estate listing.

Implementations of this aspect of the invention include the following. The camera tutorials include a "push in/push out" tutorial directing a user first to stand still with the user's left leg positioned forward in front of the first space, to hold the camera still, to align a horizontal view line in the display with a marker line, and then to put all the user's weight on the left front leg and to move the user's body forward (push-in) or backward (push-out) while taking a video of the first space. The camera tutorials include a "reveal/slide" tutorial directing a user first to stand still with feet sidewise apart in front of the first space, to hold the camera still, to align a horizontal view line in the display with a marker line, and then to move the user's body linearly sidewise left to right (or right to left) while taking a video of the first space. The camera tutorials include a "rotational" tutorial directing a user first to stand still with feet sidewise apart in front of the first space, to hold the camera still, to align a horizontal view line in the display with a marker line, and then to rotate the user's body left to right (or right to left) while taking a video of the first space. The real estate listing includes additional spaces and the method further includes selecting a template mode or a custom mode. The template mode provides one or more pre-arranged templates for arranging and presenting the videos of each space. The custom mode provides a customizable arrangement and presentation of the videos of each space. The real estate listing includes additional spaces and the method further includes providing one or more templates, selecting a template by the user and taking videos of each space of the real estate listing. Each template is configured to provide section information for each space of the real estate listing, a specific sequence arrangement of the spaces of the real estate listing, and specific music to accompany each video of each space of the real estate listing.

The real estate listing includes additional spaces and the method further includes entering section information for each space of the real estate listing, selecting specific music to accompany each video of each space of the real estate listing, taking videos of each space of the real estate listing and arranging the videos of each space in a custom order. The method further includes previewing the videos of the first space and accepting them or retaking them. The first space may be one of entrance, living room, dining room, kitchen, office, master bedroom, master bathroom, bedroom, bathroom, basement, attic, storage, backyard, frontyard, sideyard, deck, patio, and garden area. The step of providing of the real estate listing includes entering one or more of real estate listing type, location, house type, number of bedrooms, number of bathrooms, house area, lot area, additional structures and amenities. The method further includes entering one or more of a company logo, company name, company image, and company contact information.

In general, in another aspect the invention provides a system for generating a video for a real estate listing including a mobile communication device comprising a camera, a display, a central processing unit (CPU), a video generating application and a memory. The mobile communication device is configured to connect to a video application server, an online data storage device, an authentication server and a global mapping server via a network connection. The video generating application is configured to provide a user interface via the display and comprises computer implemented instructions for opening the camera and providing camera tutorials, wherein the camera tutorials comprise instructions for camera positioning, camera moving, and camera aligning while taking videos. The video generating application further comprises computer implemented instructions for taking videos of a first space of a real estate listing according to the instructions of the camera tutorials. The video generating application further comprises computer implemented instructions for uploading the videos to the memory, editing the videos and producing a composite video for the real estate listing. The mobile communication device comprises one of a tablet, a digital camera, a mobile phone, a laptop computer, or any other computing device with a camera.

The details of one or more embodiments of the invention are set forth in the accompanying drawings and description below. Other features, objects, and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 7C depicts a screen shot of the user interface for taking a video shot with the stabilization feature on;

DETAILED DESCRIPTION OF THE INVENTION

The invention provides a system and method for capturing a plurality of videos and images of an object with a camera of a mobile communication device, editing them and combining them in order to generate a video. In one embodiment, the invention provides an application for capturing, editing and combining a plurality of videos and images of a real estate structure with a mobile communication device and then generating a real estate video for a specific real estate listing.

Figure 1:
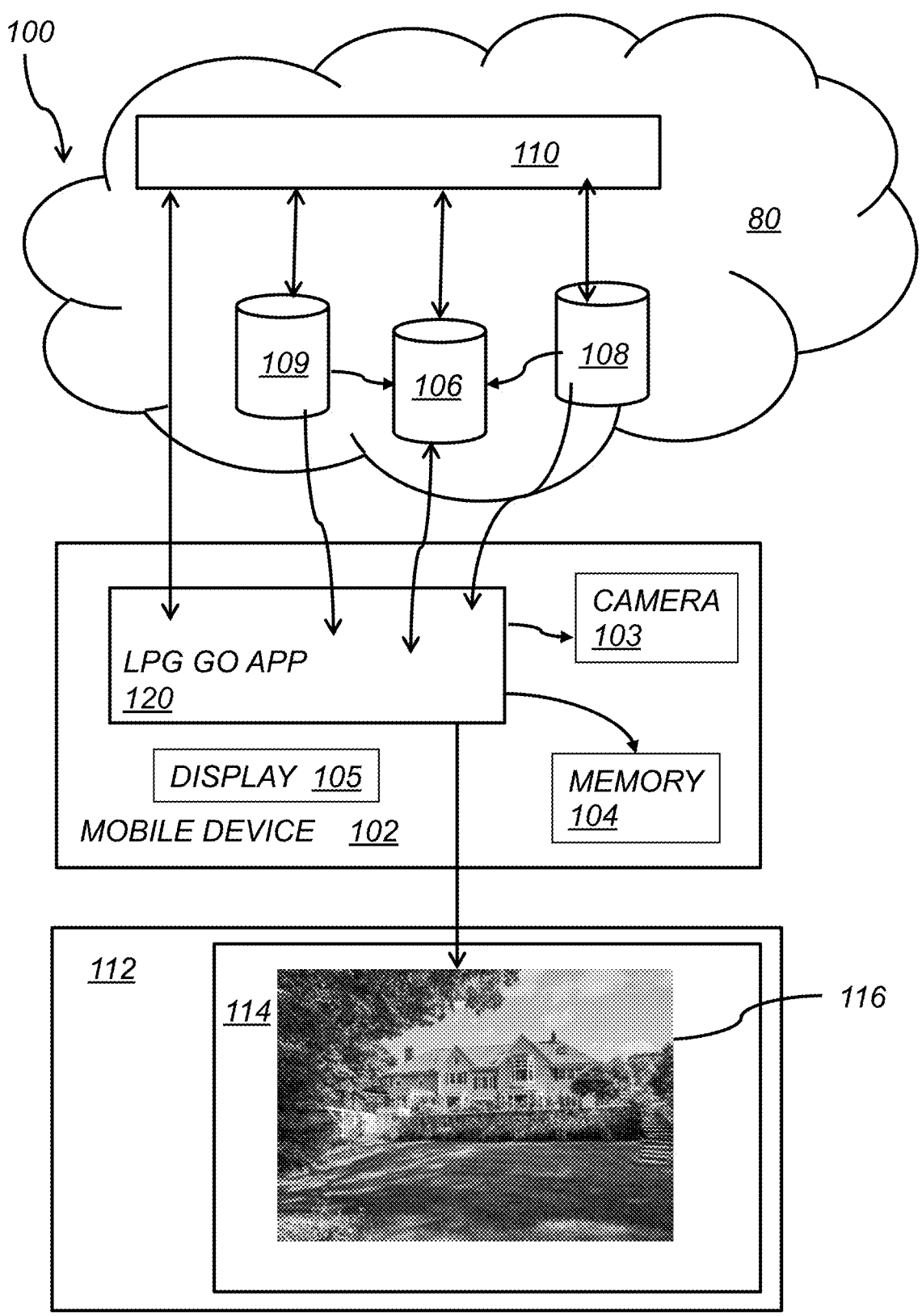
FIG. 1 is a diagrammatic view of a video generating system according to this invention.

Referring to FIG. 1, video generating system 100 according to this invention includes a mobile communication device 102 and a video generating application (LPG GO APP) 120. The mobile communication device 102 includes a camera 103, a display 105, memory 104 and a copy of the video generating application 120 stored in memory 104. The mobile communication device 102 connects via a network connection 80 to a server 110 and downloads the video generating application 120. The mobile communication device 102 also connects to an online data storage device 106, an authentication server 108 and a global mapping server 109. In one example, the mobile communication device 102 is a mobile phone (e.g., iPhone™), server 110 is a server for the Apple Store™, the online data storage device 106 is Dropbox™, the authentication server 108 is an Amazon™ server and the global mapping server 109 is a Google™ maps server. A video 116 generated with the video generating system 100 is viewed via a display 105 of the mobile communication device 102 or via a display 114 in a separate device 112. In other examples, the mobile communication device is a tablet, a digital camera, a mobile phone, a laptop computer, or any other computing device with a camera.

Figure 2:
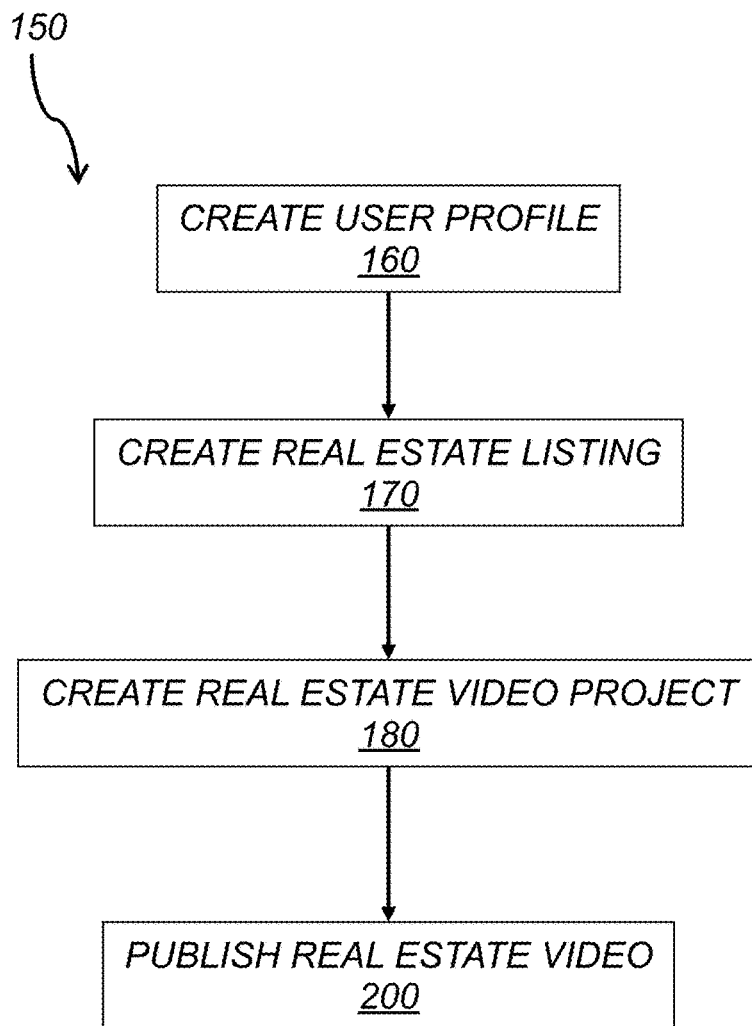
FIG. 2 is a block diagram of the process of generating a video according to this invention.

Referring to FIG. 2, a process 150 for generating a video with the video generating system 100 according to this invention includes the following steps. First, a user logs into the video generating application 120 in the mobile communication device 102 and creates a user profile (160). Next, the user creates a real estate listing (170) and then creates a real estate video project (180). Finally, the user publishes the real estate video (200).

Figure 3A:
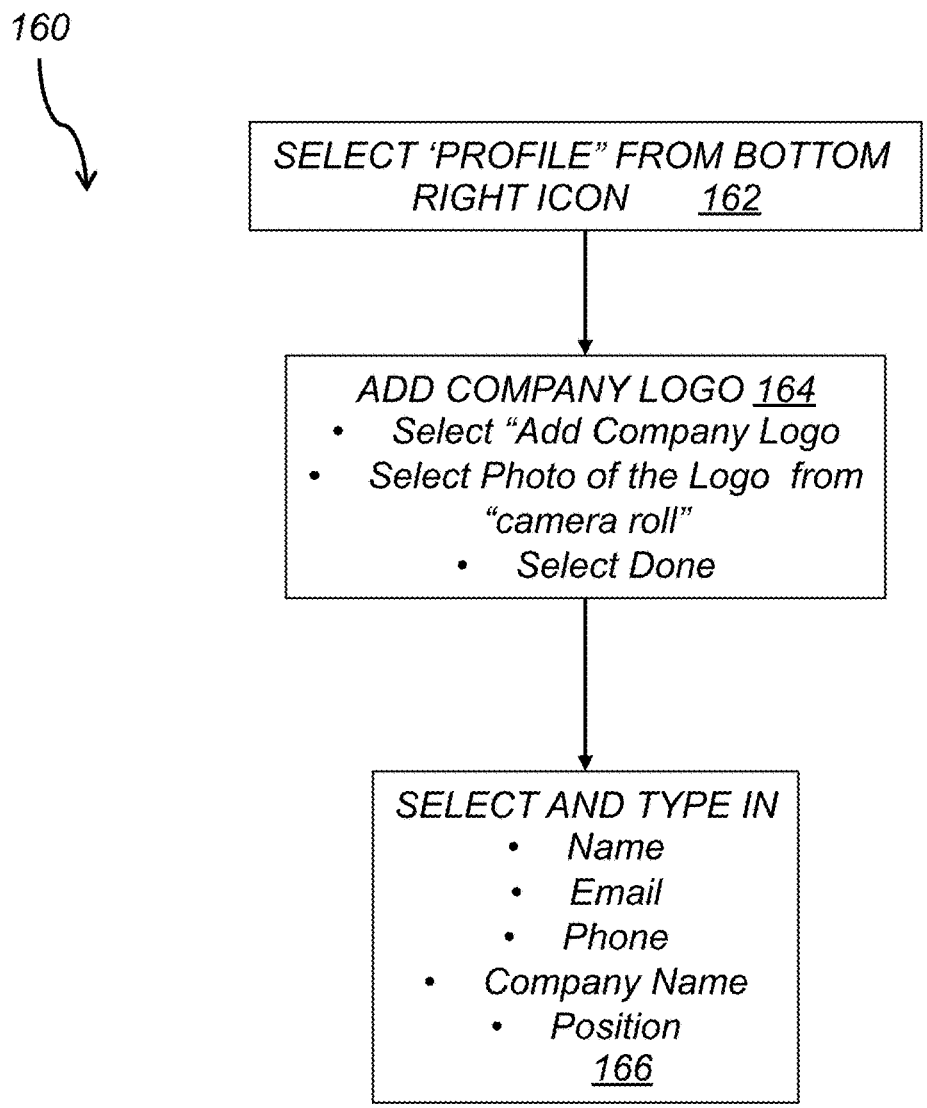
FIG. 3A is a block diagram of the step of creating a profile in the process of FIG. 2.
Figure 3B:
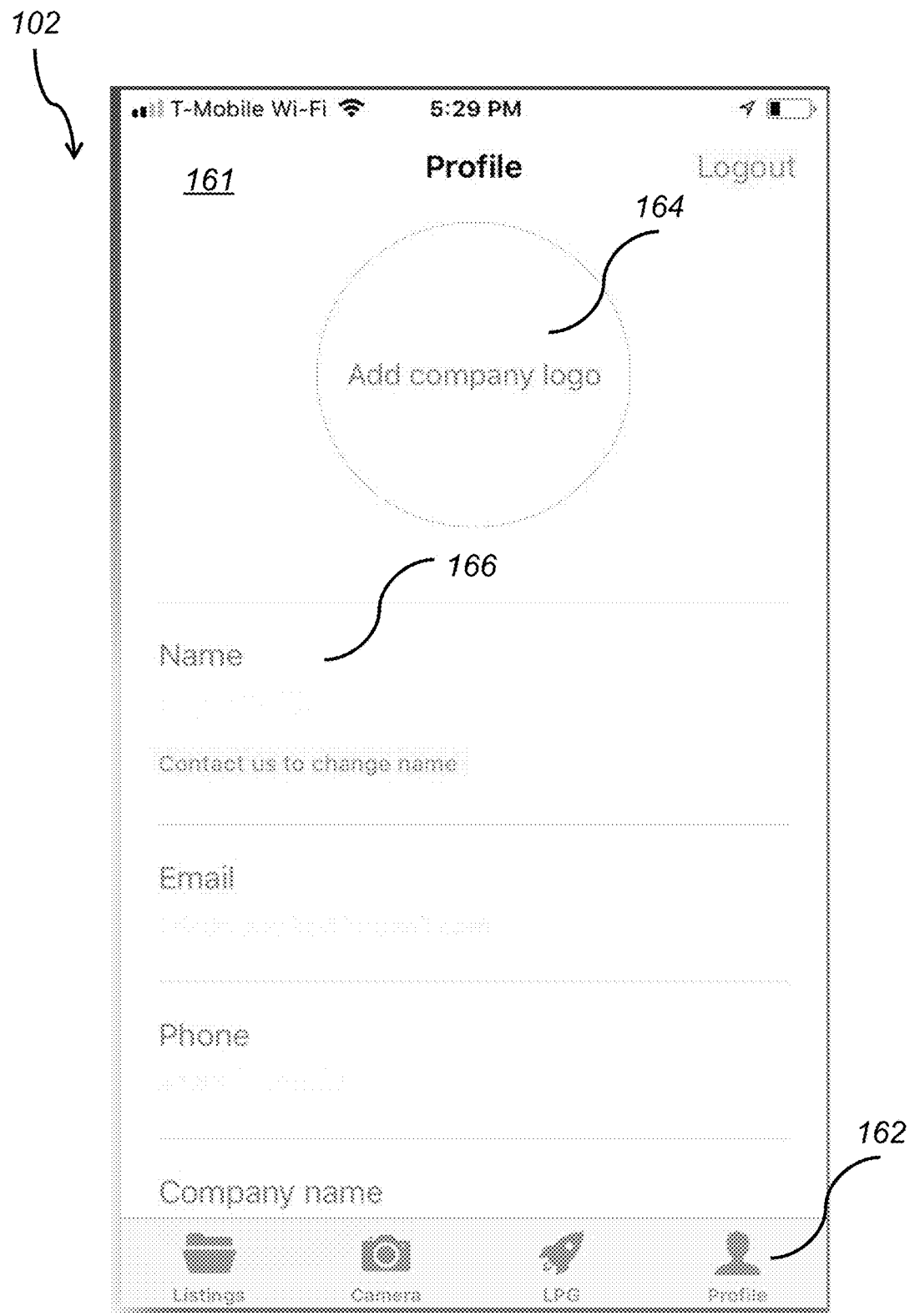
FIG. 3B depicts a screen shot of the user interface for creating a profile in the process of FIG. 2.
Figure 4A:
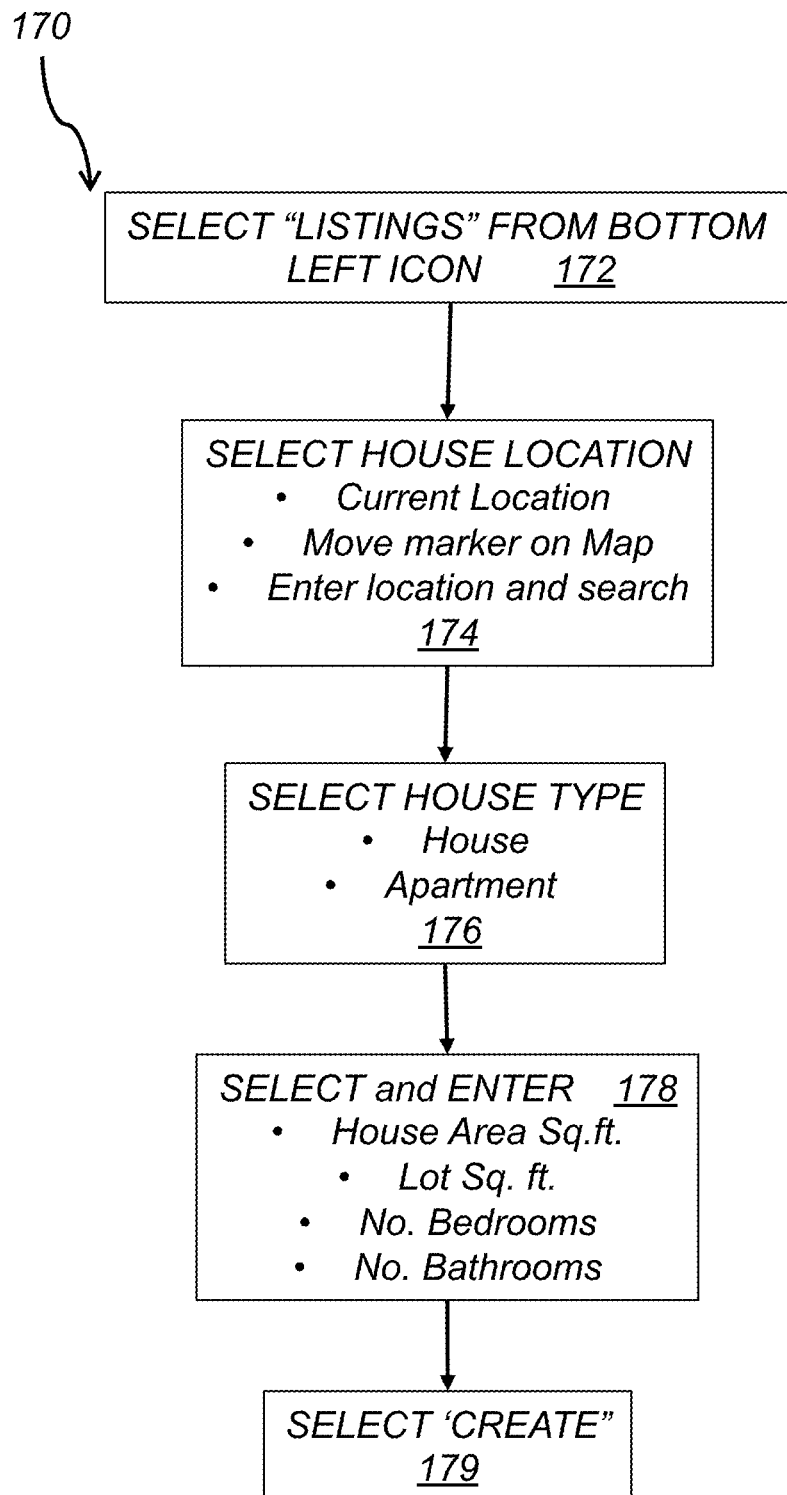
FIG. 4A is a block diagram of the step of creating a real estate listing in the process of FIG. 2.
Figure 4B:
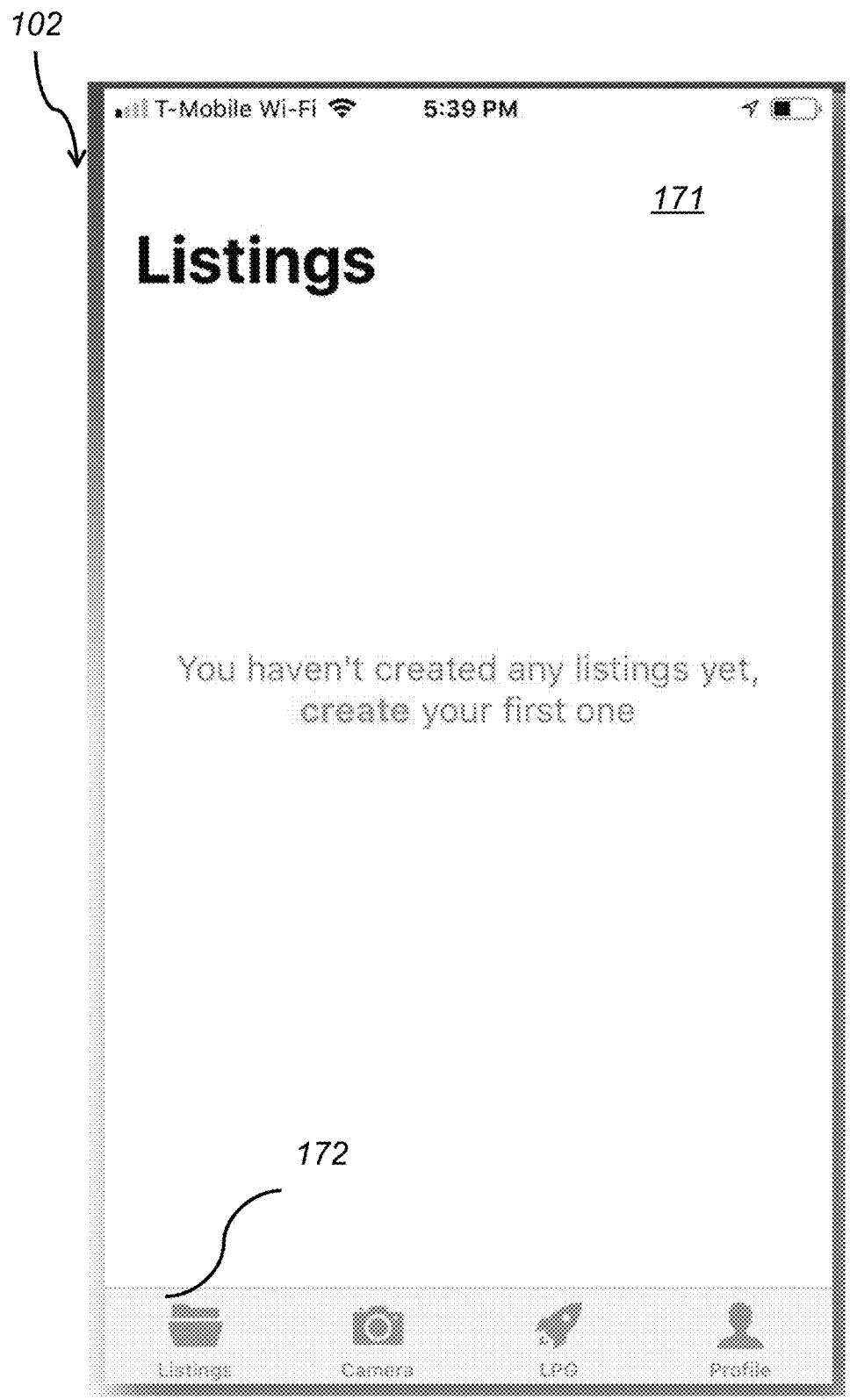
FIG. 4B depicts a screen shot of the user interface for selecting the real estate listing icon in the step of FIG. 4A.
Figure 4C:
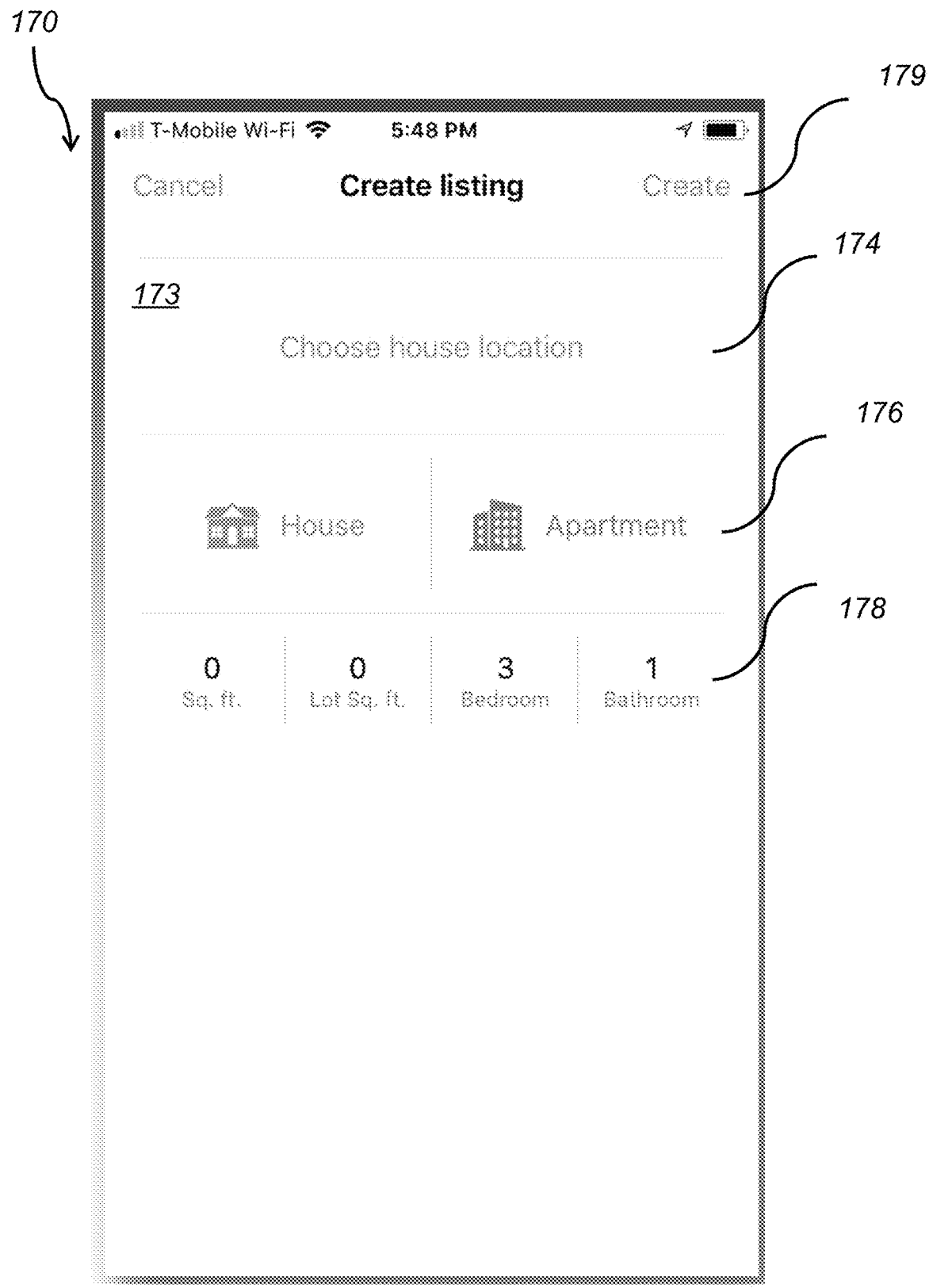
FIG. 4C depicts a screen shot of the user interface for creating a real estate listing in the step of FIG. 4A.
Figure 4D:
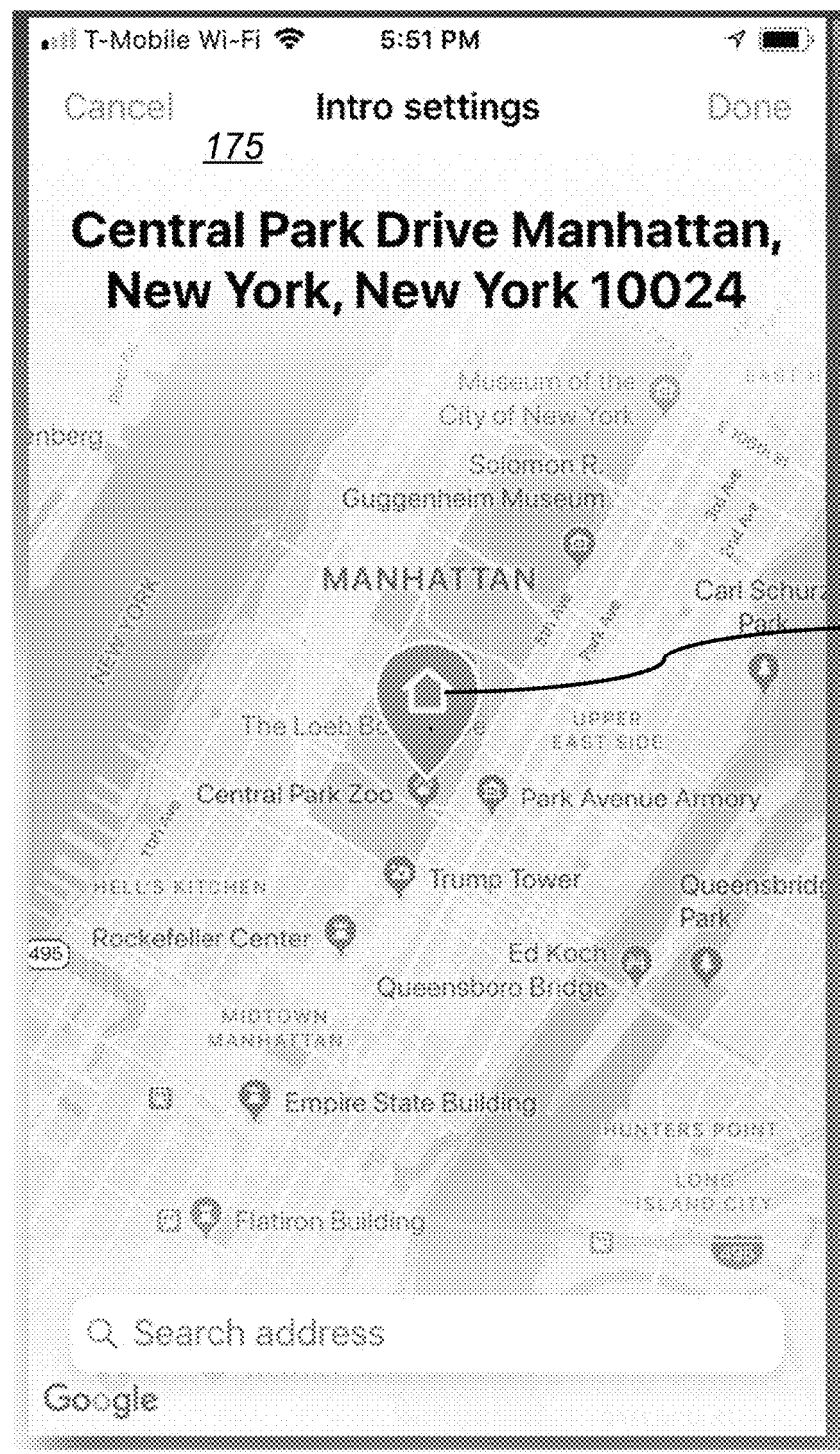
FIG. 4D depicts a screen shot of the user interface for selecting a location of a real estate listing in the step of FIG. 4A.
Figure 5:
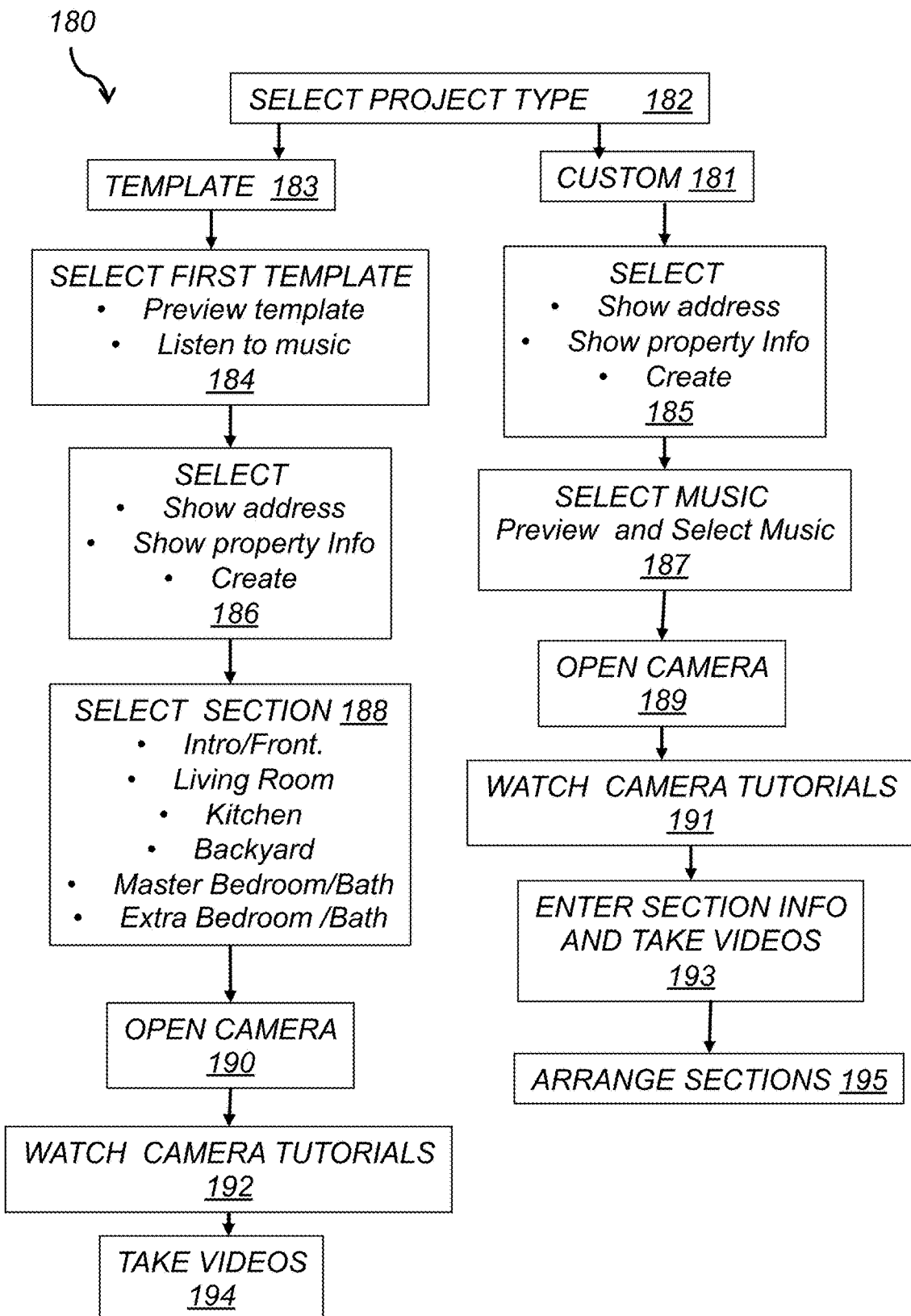
FIG. 5 depicts a block diagram of the step of creating a real estate video project in the process of FIG. 2.
Figure 6A:
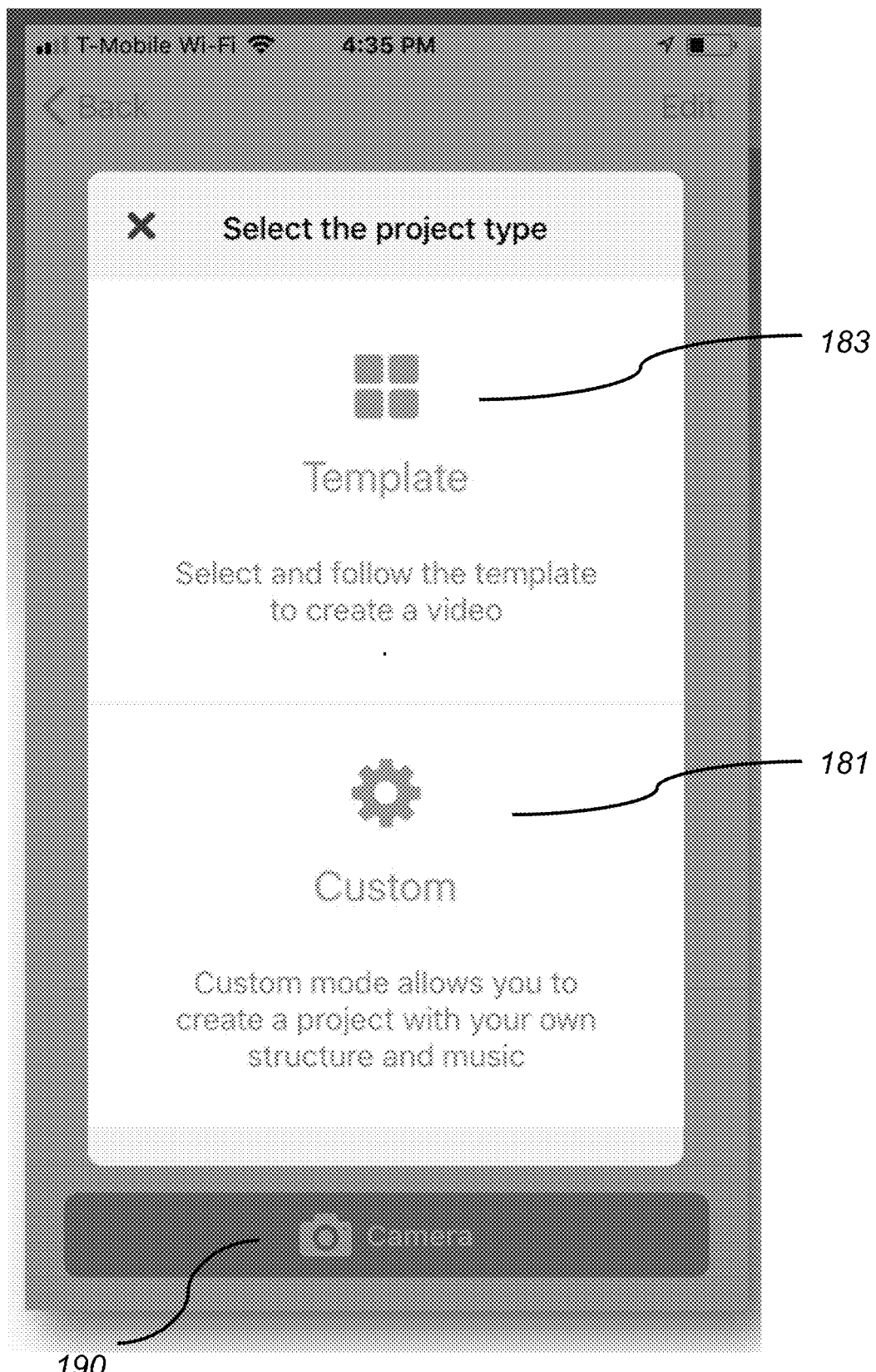
FIG. 6A depicts a screen shot of the user interface for selecting a "template" mode project type in the step of FIG. 5.
Figure 6B:
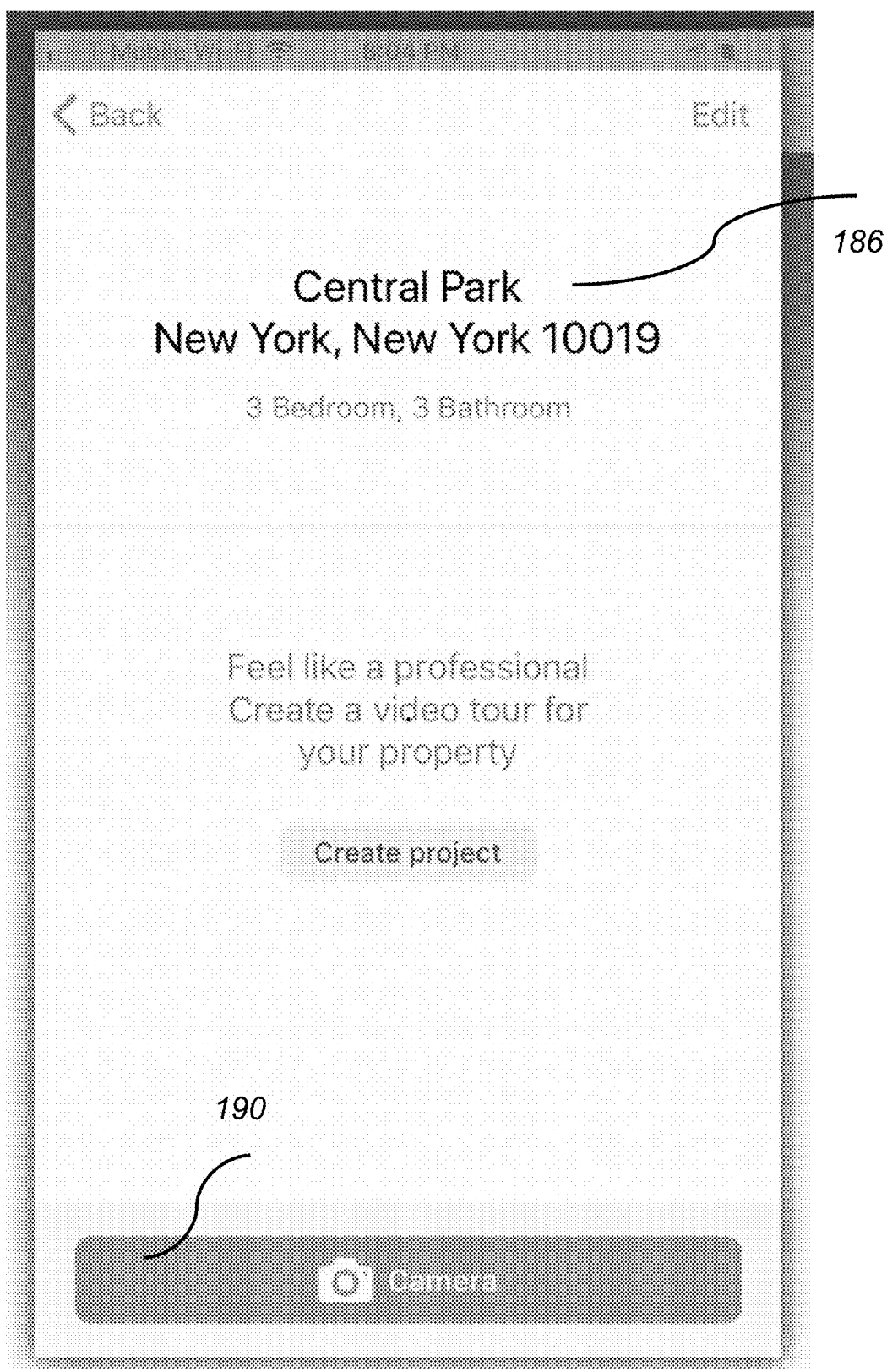
FIG. 6B depicts a screen shot of the user interface for creating a project type with the "template" mode.
Figure 6C:
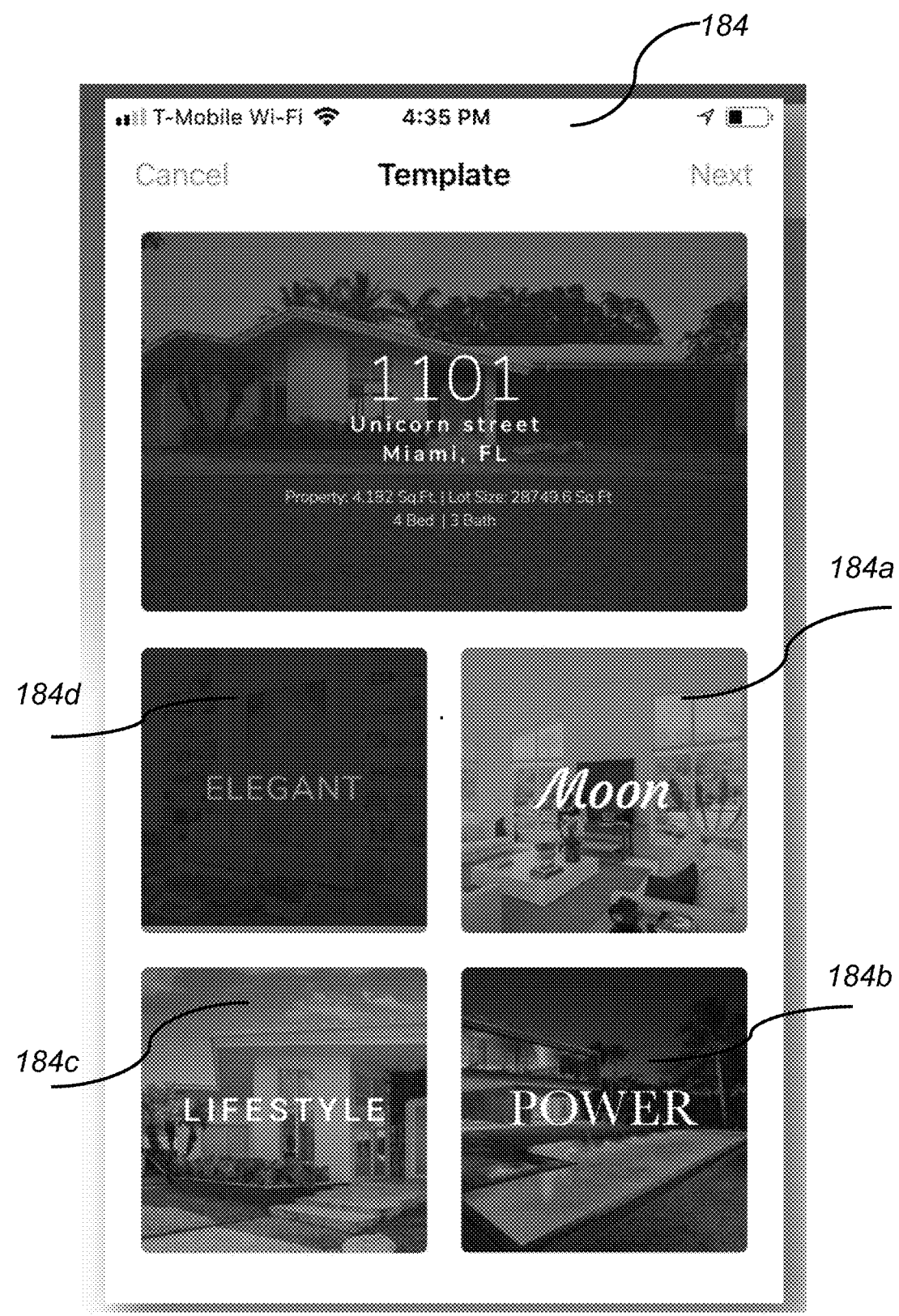
FIG. 6C depicts a screen shot of the user interface for selecting a specific "template" in the step of FIG. 5.
Figure 6D:
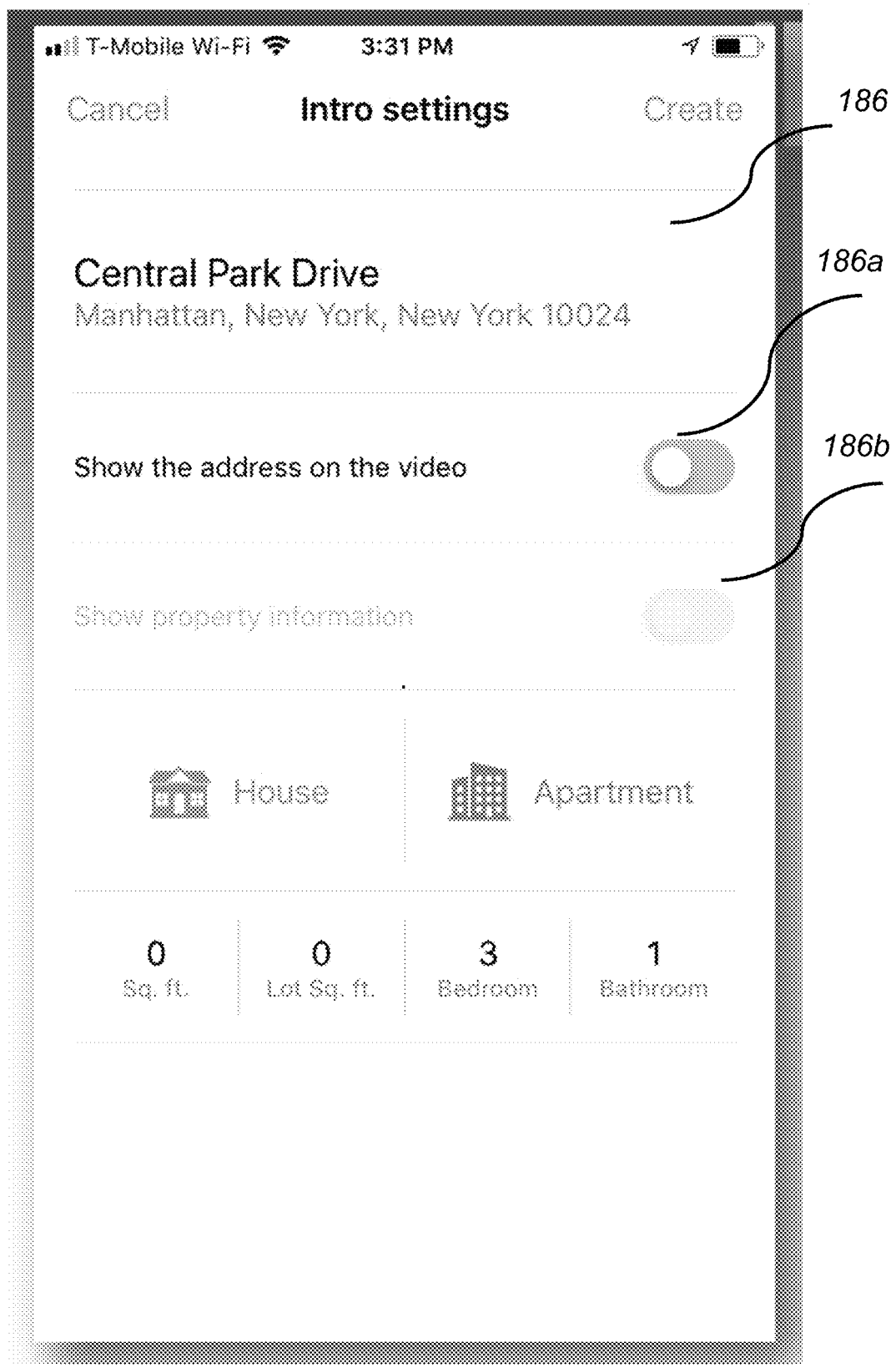
FIG. 6D depicts a screen shot of the user interface for selecting the settings for the real estate listing in the "template" mode of step of FIG. 5.
Figure 6E:
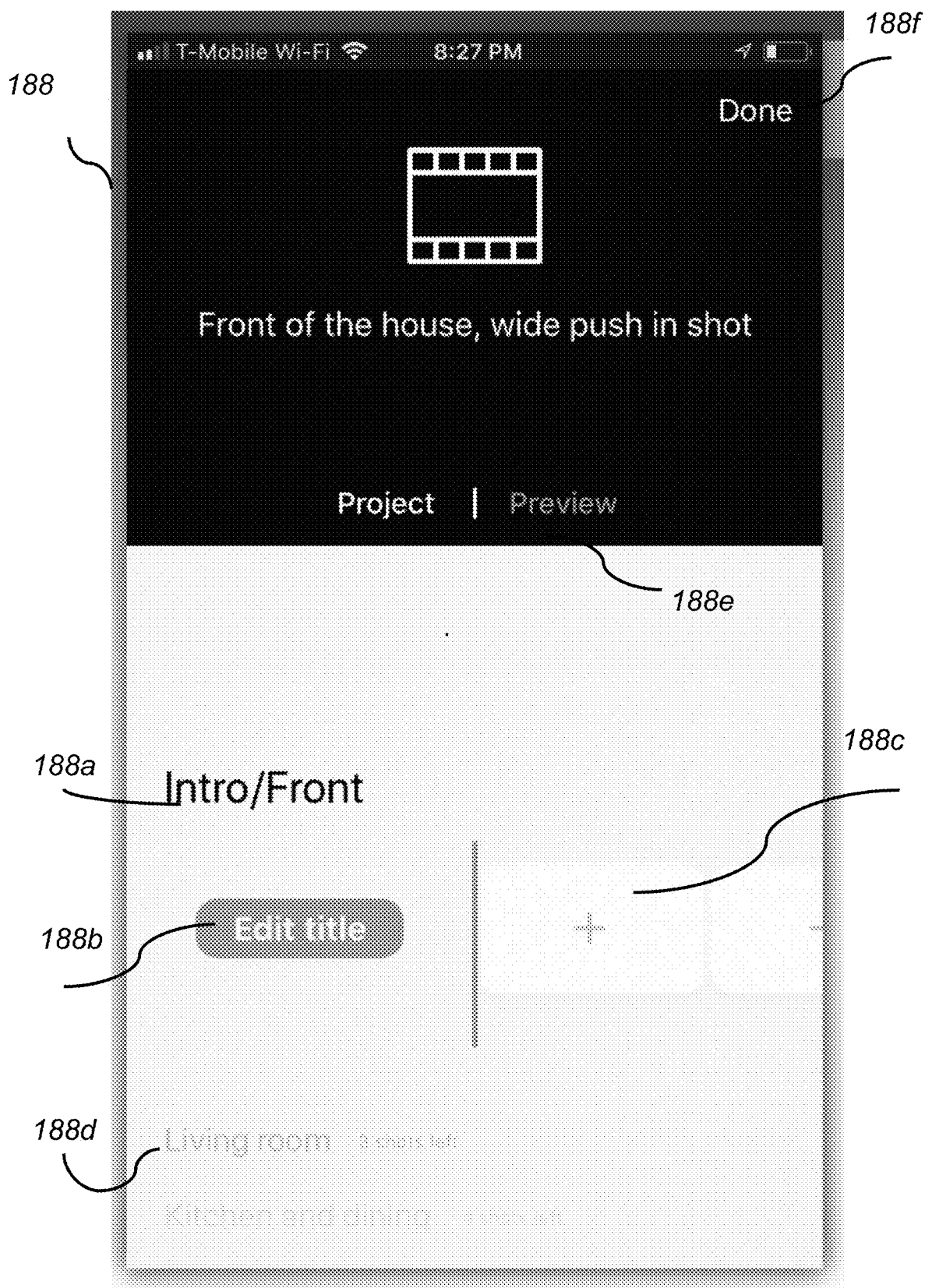
FIG. 6E depicts a screen shot of the user interface for taking a video of a section of a house in the "template" mode of step of FIG. 5.

Referring to FIG. 3A and FIG. 3B, the step of creating a user profile (160) includes the following. First, the user selects the profile icon 162 at the right bottom of the mobile communication device 102 user interface (UI) 161. In the same UI 161, the user selects "ADD COMPANY LOGO" (164), then selects an image of the company logo, enters the company logo and then selects "done". The image of the company logo is selected from the camera roll that is stored in the memory 104 of the mobile communication device 102 or is downloaded from the online storage device 106. Next, the user selects and enters in the same UI 161, name, email, phone number, company name and position, among others (166).

Referring to FIG. 4A, FIG. 4B, FIG. 4C and FIG. 4D, the step of creating a real estate listing (170) includes the following. First, the user selects the listing icon 172 at the right bottom of the mobile communication device 102 user interface (UI) 171. Next, the user selects "Choose house location" (174) in the UI 173. The location may be "current location", or may be entered by moving a marker 177 on an online map 175, or the location may be typed in and searched in the map 175. Next, the user selects the type of house (176). The type of house may be an apartment or a single-family house. Next, the user selects and enters the size of the house, the size of the lot, the number of bedrooms, number of bathrooms and other house information (178), and then the user selects "create" (179).

Figure 7A:
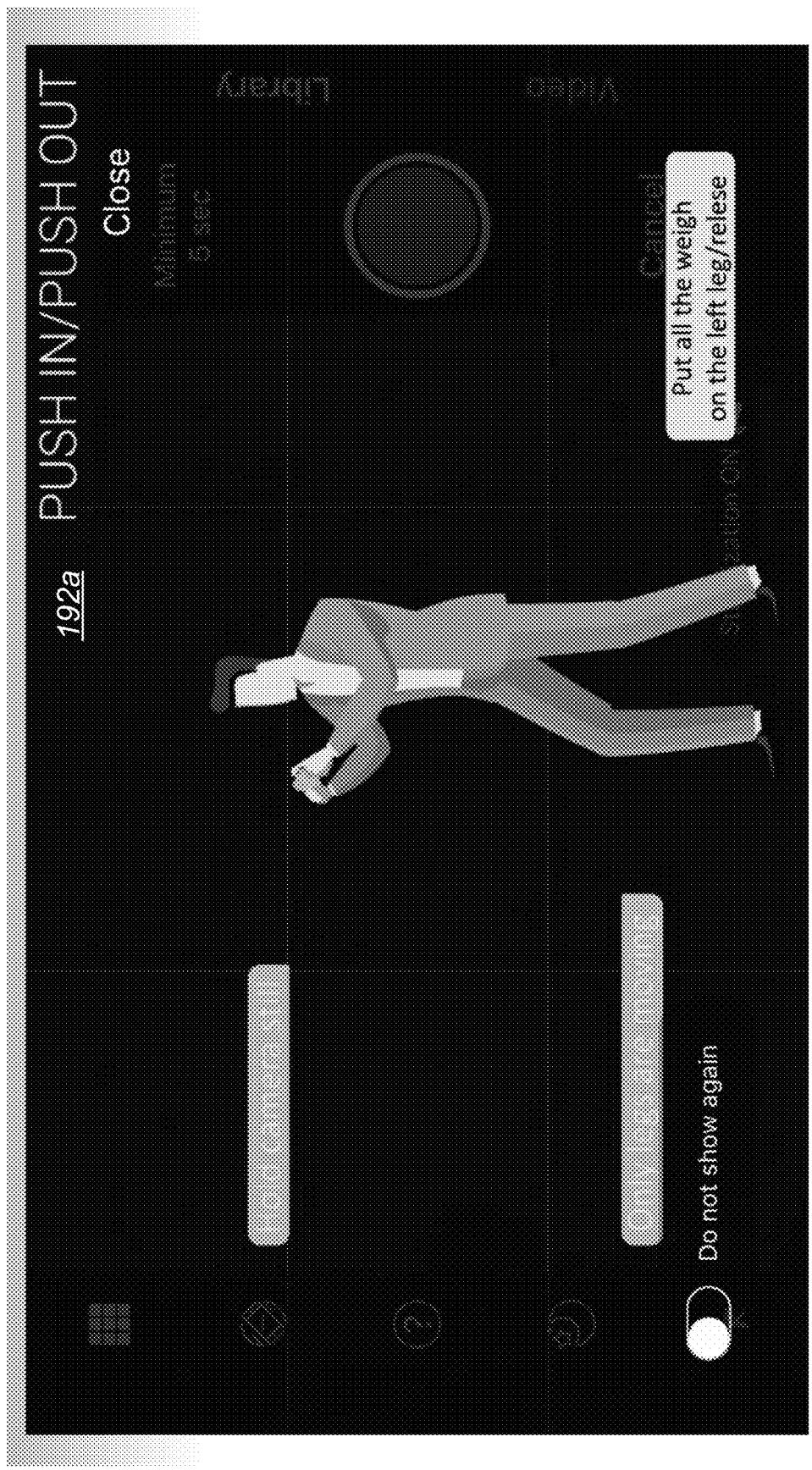
FIG. 7A depicts a screen shot of the tutorial for taking a "push in/push out" shot in the step of FIG. 5.
Figure 7B:
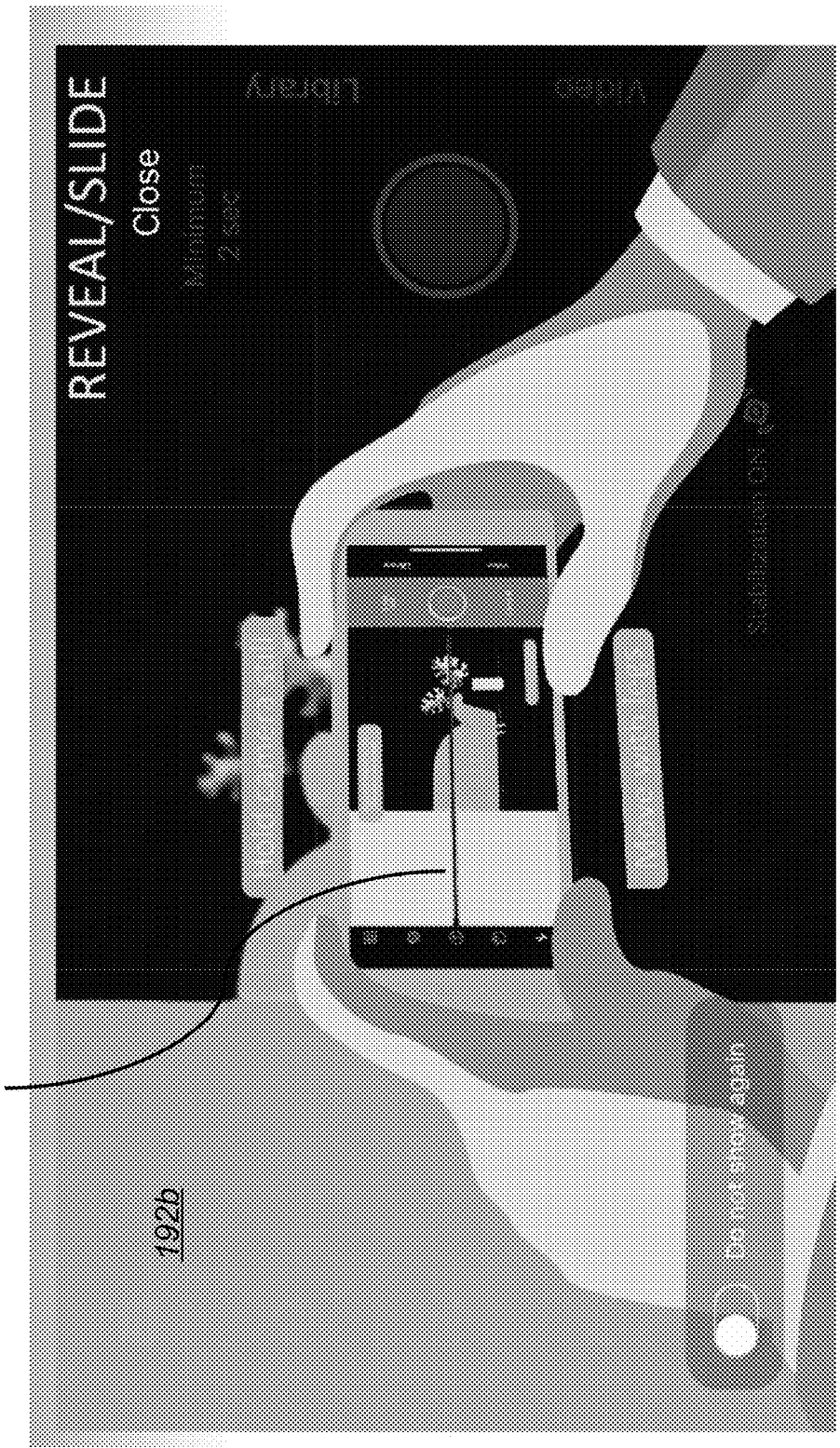
FIG. 7B depicts a screen shot of the tutorial for taking a "reveal/slide" shot in the step of FIG. 5.
Figure 7C:
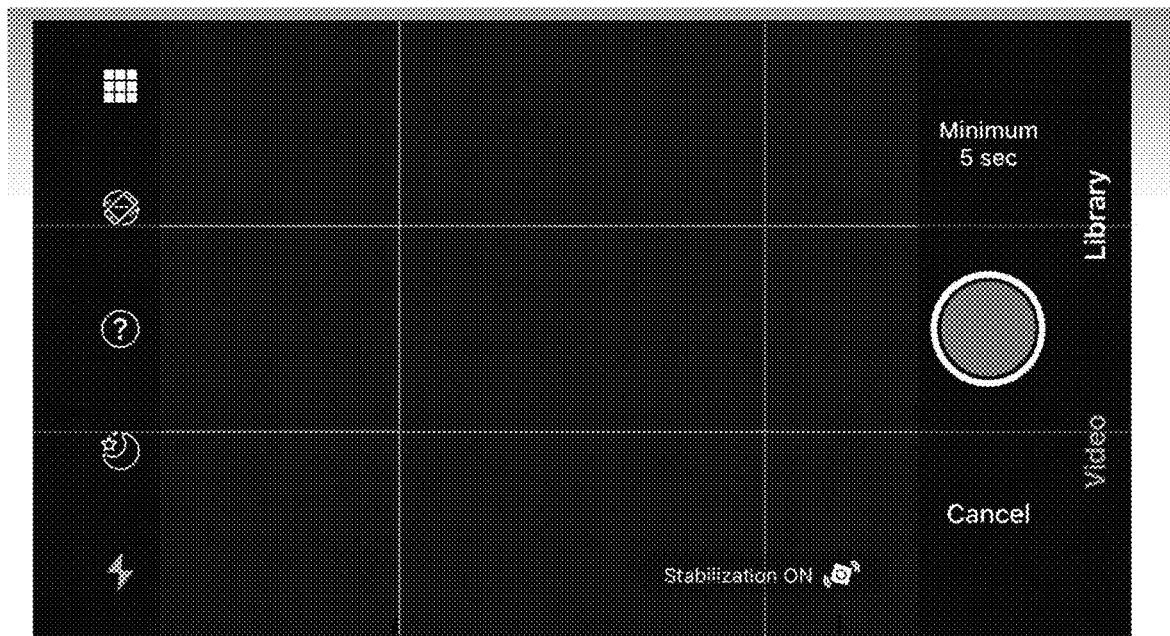

Referring to FIG. 5, FIG. 6A-FIG. 6E, FIG. 7A-FIG. 7C and FIG. 8A-FIG. 8C, the step of creating a real estate video project (180) includes the following. First, the user selects the project type that is to be created by using either a "Template" mode (183) or a "Custom" mode (181). The "Template" mode (183) provides a pre-arranged set of sections and walks the user through guided steps to create a video without having to make any creative effort or planning regarding structure and music. The "Custom" mode (181) allows the users to create a video with their own structure and music that can be chosen from a music library. The user can create multiple video projects for the same listing. In the "Template" mode (183) the user previews the available templates and listens to the music that accompanies each of the videos by touching the speaker icon that appears when a specific video is selected (184). Next, the user selects a first template and chooses to show or not show the property address and property information and then selects "create" (186). The template provides various pre-arranged sections including the front section of the property (Intro/Front) 188a, living room 188d, kitchen, backyard, master bedroom, master bathroom, extra bedroom, extra bathroom, among others. The user selects the section (188a, 188d) that is to be videographed (188) and then opens the camera of the mobile communication device (190). The title of the section may be edited and changed if necessary by selecting the edit title button (188b). The camera of the mobile communication device is opened by selecting the + button (186). Once the camera opens, several tutorial videos (192a-192c) become automatically available to play (192). The tutorial videos instruct the user how to shoot a video in order to get the best results. After watching the tutorial videos, the user proceeds to take the video of the selected section (194). The process repeats for each section until all sections are videographed. In one example, a push in/push out video tutorial 192a directs the user to stand still with the left leg forward in front of the room to be videographed, hold the camera still, align the horizontal view line with a yellow marker line, put all the weight on the left front leg and move the body forward (push-in) or backward (push-out) while taking the shot, as shown in FIG. 7A. In another example, a reveal/slide video tutorial 192b directs the user to stand still with the feet sidewise apart in front of the room or object to be videographed, hold the camera still, align the horizontal view line with a yellow marker line, and move the body linearly sidewise left to right (or right to left) while taking the shot, as shown in FIG. 7B. In another example, a rotation video tutorial directs the user to stand still with the feet sidewise apart in front of the room or object to be video-graphed, hold the camera still, align the horizontal view line with a yellow marker line, and rotate the body left to right (or right to left) while taking the shot. The user has the option to preview each video and choose "done" if satisfied with the quality of the video, or delete the video and take the video again. The user has the option to preview each video 188e and choose "done" 188f if satisfied with the quality of the video, or delete the video and take the video again.

Figure 9:
FIG. 9 depicts a screen shot of the user interface for asking a professional to create a real estate project using the process of FIG. 2.

In the "Custom" mode (181) the user first chooses to show or not show the property address 185a and property information 185b and then selects "create" (185). Next, the user previews and selects the music that will accompany the video by clicking the music icon (187) and then opens the camera of the mobile communication device by selecting the + button 193b (189). Once the camera opens, several tutorial videos 192a-192c become automatically available to play to show the user how to shoot the video in order to get the best results (191). After watching the tutorial videos 192a-192c, the user proceeds to enter the title and information of a first section of the property and then takes the video of the first section (193). The video tutorials are similar to the above mentioned tutorial examples. The video of each section is previewed and accepted or deleted and retaken, if necessary. The process repeats for each desired section until all desired sections are videographed. Next, the user arranges the videos of the various sections according to his preference and then the application composes the video from the individual video sections within 30 seconds and presents is for a preview (195). If the final video is acceptable, the user presses the "done" icon and the application saves the final product. If the user is not satisfied with the final product, he can go back into the project, delete the video sections that he does not like and retake them again. The application also provides the option to contact a professional videographer to assist with the video taking, if necessary, as shown in FIG. 9. The professional videographer is contacted via e-mail or phone, as shown in FIG. 9, or via a text or messaging service.

Figure 7D:
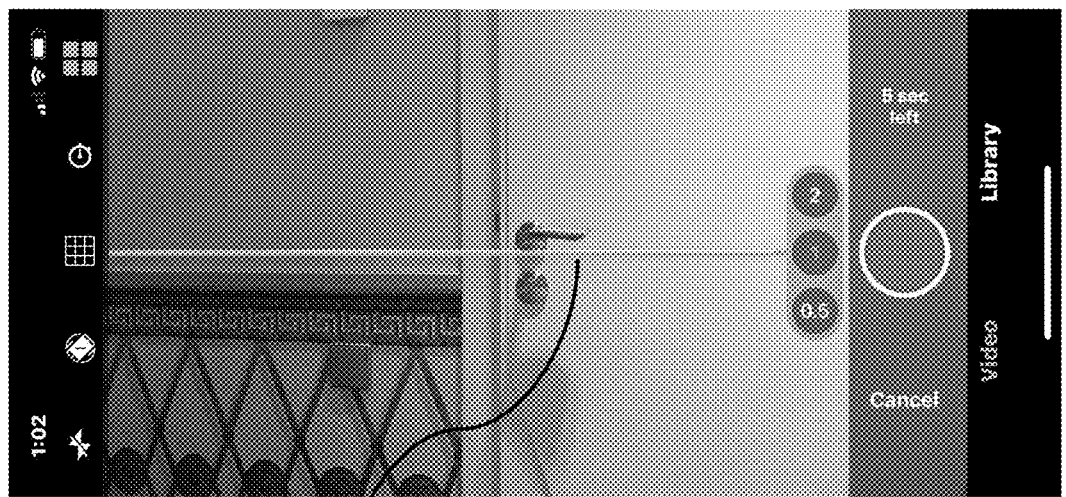
FIG. 7D depicts a screen shot of the user interface for taking a video shot showing the marker line.
Figure 8A:
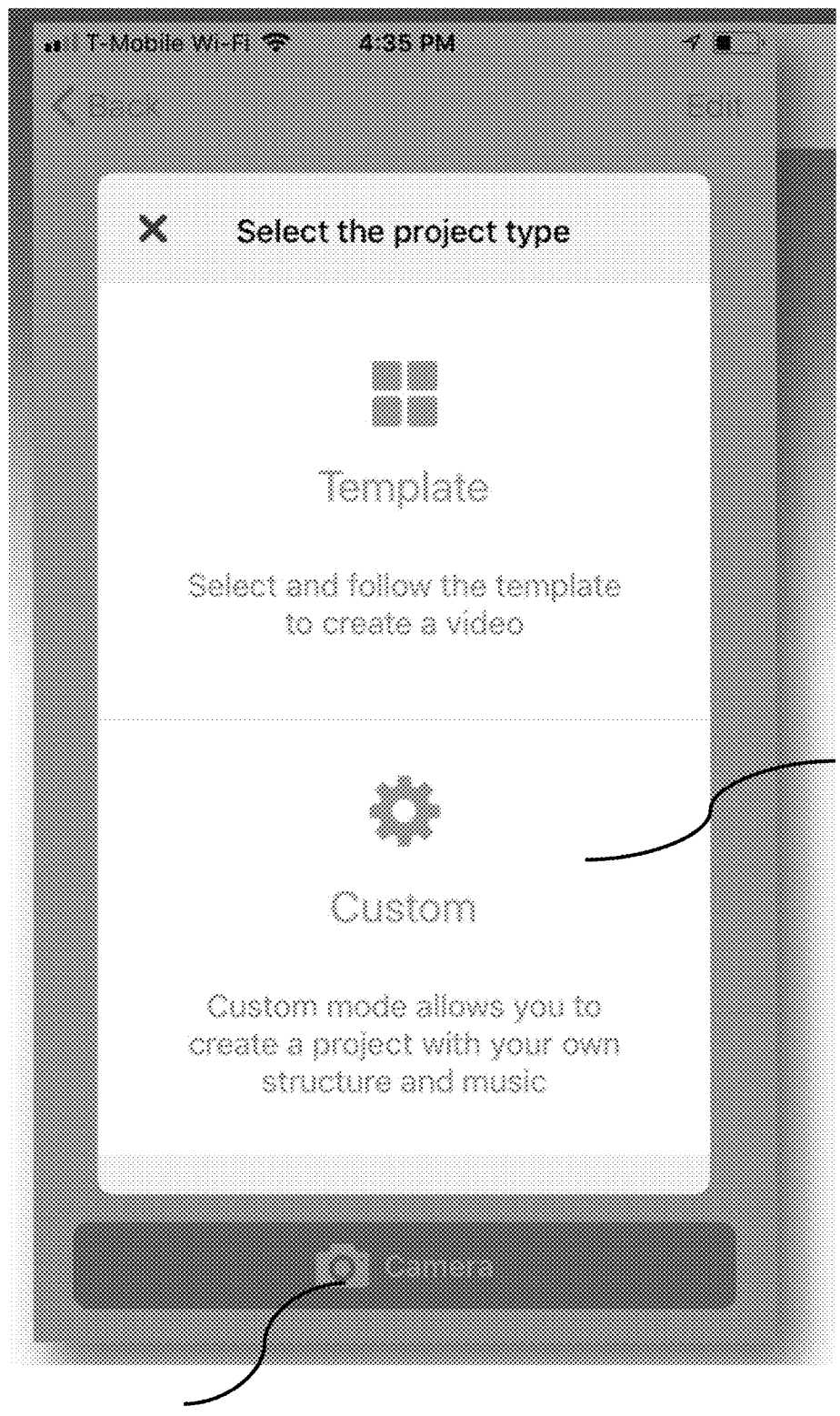
FIG. 8A depicts a screen shot of the user interface for selecting a "custom" mode project type in the step of FIG. 5.
Figure 8B:
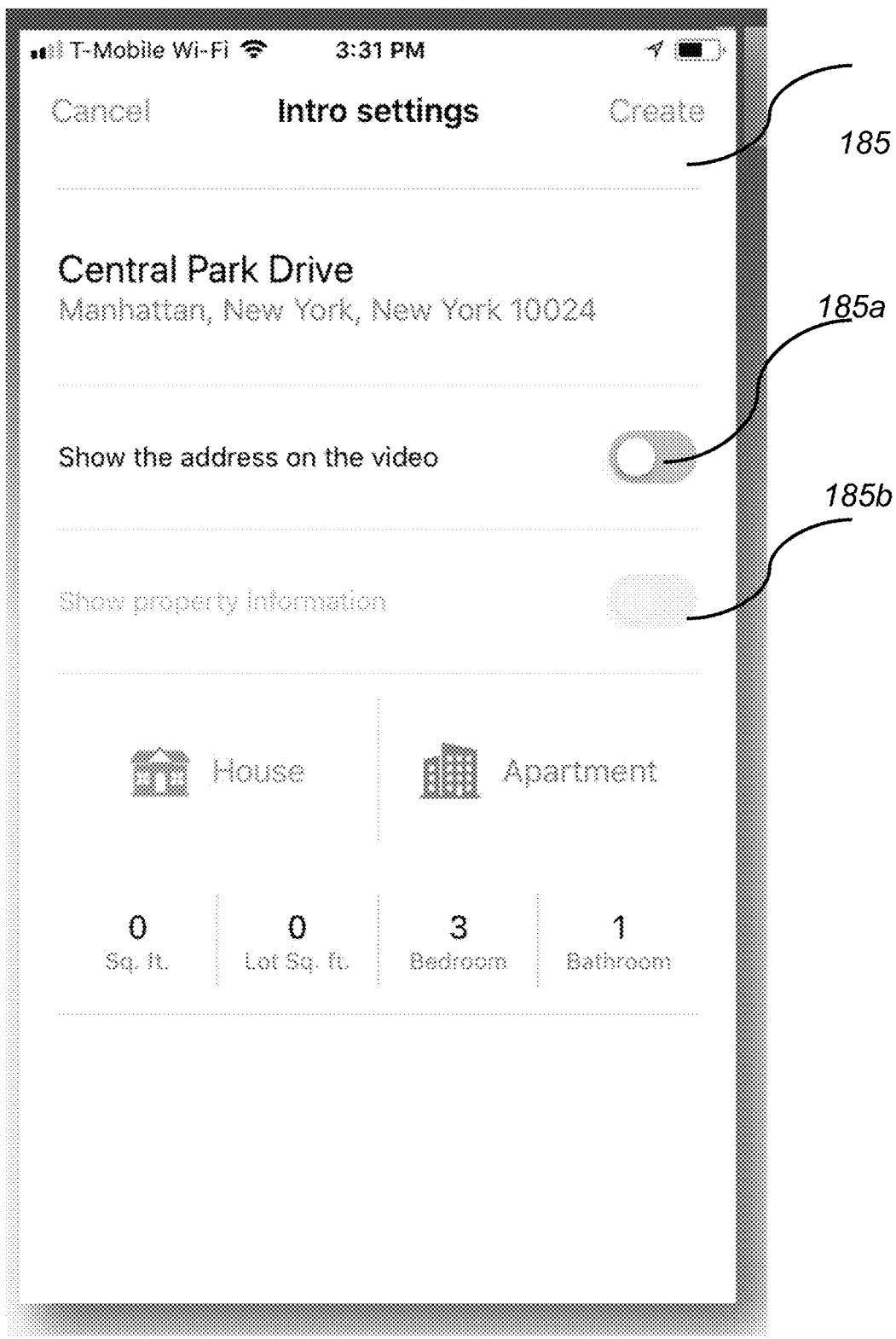
FIG. 8B depicts a screen shot of the user interface for selecting the settings for the real estate listing in the "custom" mode step of FIG. 5.
Figure 8C:
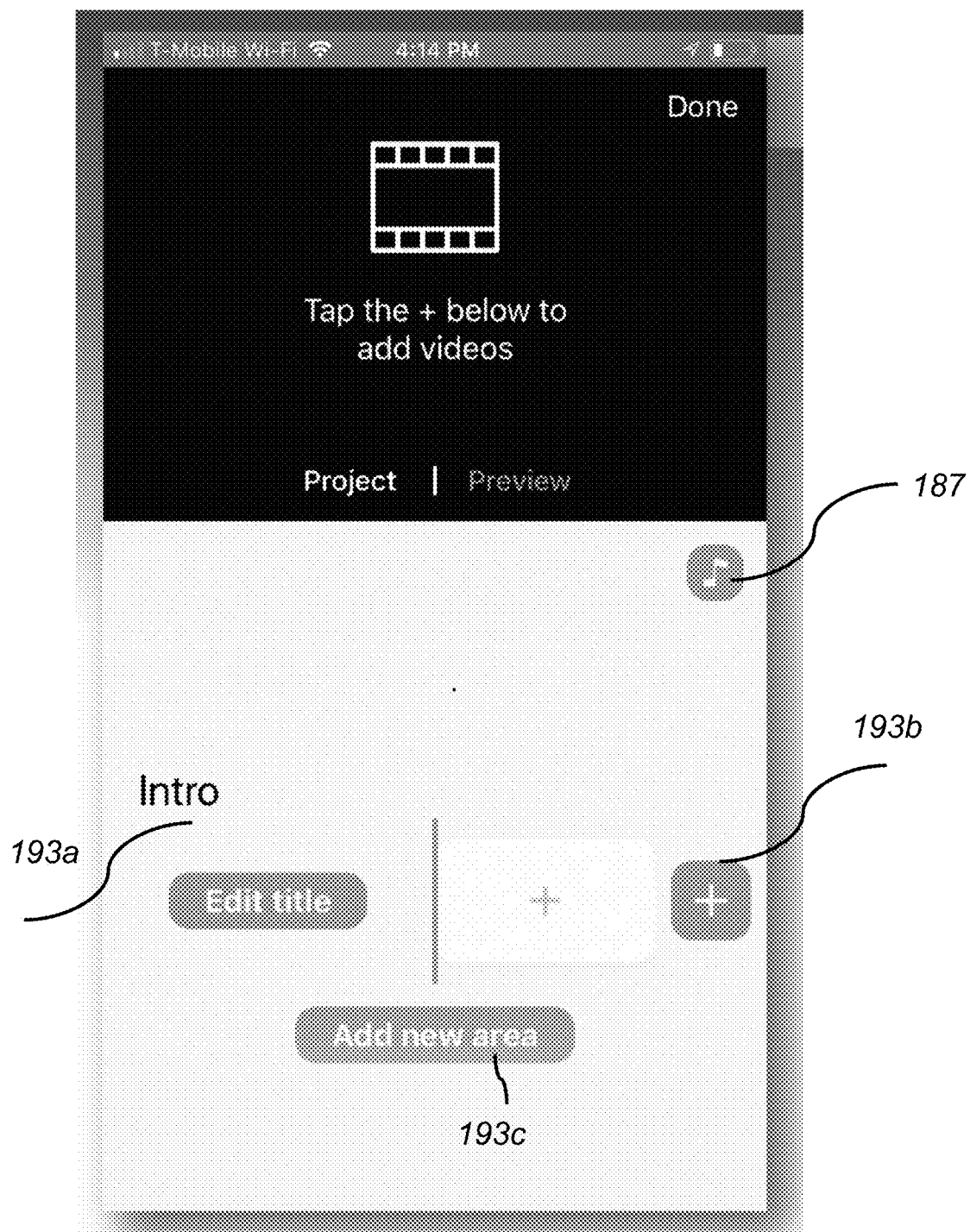
FIG. 8C depicts a screen shot of the user interface for taking a video of the front of the house section in the "custom" mode step of FIG. 5.

As was mentioned above, there is a yellow marker line 192e that needs to be aligned with the horizontal view line to ensure that the mobile communication device is held straight and at the right height, as shown in FIG. 7B. Once the yellow marker line 192e is aligned with the horizontal view line, the yellow marker line becomes green 192e', as shown in FIG. 7D. The application also provides a grid 192d displayed on the camera screen in order to line up the horizon. The user receives a green light to start video recording only after the horizontal marker line 192e is aligned with the horizontal view line. This horizontal alignment is important especially for real estate listing application because the vertical lines of the listed property need to look straight. In addition, it is important to make the space look as big as possible and therefore ultra-wide lenses are added to the camera of the mobile phones that are used for the video recording. The camera lenses have 1× and 2× focal lengths. In addition to the video tutorials, the application provides a stabilization tool 192c that stabilizes the shot so it is smooth. Other application tools include a brightness adjuster that adjusts the brightness of the shot and an auto flash on/off button.

Figure 10:
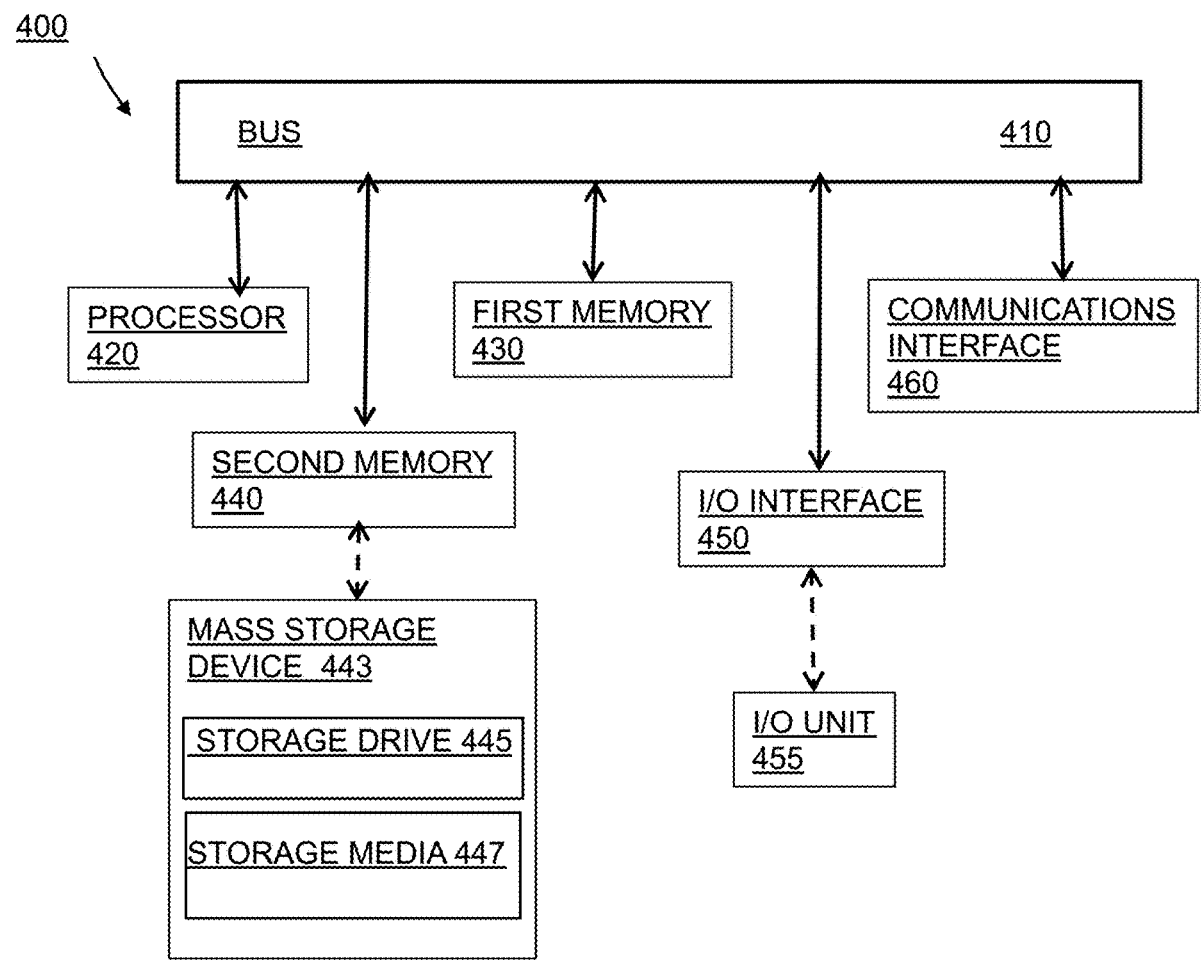
FIG. 10 depicts a computer system used for running the applications and methods of this invention.

Referring to FIG. 10, an exemplary computer system 400 associated with the mobile communication device or network architecture that may be used to implement the system of the present invention includes at least a processor 420, first memory 430, second memory 440, I/O interface 450 and communications interface 460. All these computer components are connected via a bus 410. One or more processors 420 may be used. Processor 420 may be a special-purpose or a general-purpose processor. As shown in FIG. 10, bus 410 connects the processor 420 to various other components of the computer system 400. Bus 410 may also connect processor 420 to other components (not shown) such as, sensors, and servomechanisms. Bus 410 may also connect the processor 420 to other computer systems. Processor 420 can receive computer code via the bus 410. The term "computer code" includes applications, programs, instructions, signals, and/or data, among others. Processor 420 executes the computer code and may further send the computer code via the bus 410 to other computer systems. One or more computer systems 400 may be used to carry out the computer executable instructions of this invention.

Computer system 400 may further include one or more memories, such as first memory 430 and second memory 440. First memory 430, second memory 440, or a combination thereof function as a computer usable storage medium to store and/or access computer code. The first memory 430 and second memory 440 may be random access memory (RAM), read-only memory (ROM), a mass storage device, or any combination thereof. As shown in FIG. 10, one embodiment of second memory 440 is a mass storage device 443. The mass storage device 443 includes storage drive 445 and storage media 447. Storage media 447 may or may not be removable from the storage drive 445. Mass storage devices 443 with storage media 447 that are removable, otherwise referred to as removable storage media, allow computer code to be transferred to and/or from the computer system 400. Mass storage device 443 may be a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device, USB drive, among others. Mass storage device 443 may also be program cartridges and cartridge interfaces, removable memory chips (such as an EPROM, or PROM) and associated sockets.

The computer system 400 may further include other means for computer code to be loaded into or removed from the computer system 400, such as the input/output ("I/O") interface 450 and/or communications interface 460. Both the I/O interface 450 and the communications interface 460 allow computer code to be transferred between the computer system 400 and external devices including other computer systems. This transfer may be bi-directional or omni-direction to or from the computer system 400. Computer code transferred by the I/O interface 450 and the communications interface 460 are typically in the form of signals, which may be electronic, electromagnetic, optical, or other signals capable of being sent and/or received by the interfaces. These signals may be transmitted via a variety of modes including wire or cable, fiber optics, a phone line, a cellular phone link, infrared ("IR"), and radio frequency ("RF") link, among others.

The I/O interface 450 may be any connection, wired or wireless, that allows the transfer of computer code. In one example, I/O interface 450 includes an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card, among others. In certain embodiments the I/O interface connects to an I/O unit 455 such as a user interface, monitor, speaker, printer, touch screen display, among others. Communications interface 460 may also be used to transfer computer code to computer system 400. Communication interfaces include a modem, network interface (such as an Ethernet card), wired or wireless systems (such as Wi-Fi, Bluetooth, and IR), local area networks, wide area networks, and intranets, among others.

The invention is also directed to computer products, otherwise referred to as computer program products, to provide software that includes computer code to the computer system 400. Processor 420 executes the computer code in order to implement the methods of the present invention. In one example, the methods according to the present invention may be implemented using software that includes the computer code that is loaded into the computer system 400 using a memory 430, 440 such as the mass storage drive 443, or through an I/O interface 450, communications interface 460, or any other interface with the computer system 400. The computer code in conjunction with the computer system 400 may perform any one of, or any combination of, the steps of any of the methods presented herein. The methods according to the present invention may be also performed automatically, or may be invoked by some form of manual intervention. The computer system 400, or network architecture, of FIG. 10 is provided only for purposes of illustration, such that the present invention is not limited to this specific embodiment.

Several embodiments of the present invention have been described. Nevertheless, it will be understood that various modifications may be made without departing from the spirit and scope of the invention. Accordingly, other embodiments are within the scope of the following claims.

What is claimed is:

1. A computer-implemented method for generating a video for a real estate listing comprising:
providing a real estate listing comprising at least a first space;
providing a mobile communication device comprising a camera, a display, a central processing unit (CPU), a video generating application and a memory;
starting the video generating application;
opening the camera and providing camera tutorials, wherein the camera tutorials comprise instructions for camera positioning, camera moving, and camera aligning while taking videos;
taking videos of the first space following the instructions for camera positioning, camera moving, and camera aligning while taking videos;
uploading the videos to the memory, editing the videos and producing a composite video for the real estate listing; and
wherein the camera tutorials comprise a "push in/push out" tutorial directing a user first to stand still with the user's left leg positioned forward in front of the first space, to hold the camera still, to align a horizontal view line in the display with a marker line, and then to put all the user's weight on the left front leg and to move the user's body forward (push-in) or backward (push-out) while taking a video of the first space.

2. The method of claim 1, further comprising providing a stabilization tool and stabilizing the videos with the stabilization tool.

3. The method of claim 1, wherein the real estate listing comprises additional spaces and wherein the method further comprises selecting a template mode or a custom mode and wherein the template mode provides one or more prearranged templates for arranging and presenting the videos of each space and wherein the custom mode provides a customizable arrangement and presentation of the videos of each space.

4. The method of claim 1, wherein the real estate listing comprises additional spaces and wherein the method further comprises providing one or more templates, selecting a template by the user and taking videos of each space of the real estate listing, wherein each template is configured to provide section information for each space of the real estate listing, a specific sequence arrangement of the spaces of the real estate listing, and specific music to accompany each video of each space of the real estate listing.

5. The method of claim 1, wherein the real estate listing comprises additional spaces and wherein the method further comprises entering section information for each space of the real estate listing, selecting specific music to accompany each video of each space of the real estate listing, taking videos of each space of the real estate listing and arranging the videos of each space in a custom order.

6. The method of claim 1 further comprising previewing the videos of the first space and accepting them or retaking them.

7. The method of claim 1, wherein the first space comprises one of entrance, living room, dining room, kitchen, office, master bedroom, master bathroom, bedroom, bathroom, basement, attic, storage, backyard, frontyard, sideyard, deck, patio, and garden area.

8. The method of claim 1, wherein the providing of the real estate listing comprises entering one or more of real estate listing type, location, house type, number of bedrooms, number of bathrooms, house area, lot area, additional structures and amenities.

9. The method of claim 1, further comprising entering one or more of a company logo, company name, company image, and company contact information.

10. A computer-implemented method for generating a video for a real estate listing comprising:
providing a real estate listing comprising at least a first space;
providing a mobile communication device comprising a camera, a display, a central processing unit (CPU), a video generating application and a memory;
starting the video generating application;
opening the camera and providing camera tutorials, wherein the camera tutorials comprise instructions for camera positioning, camera moving, and camera aligning while taking videos;
taking videos of the first space following the instructions for camera positioning, camera moving, and camera aligning while taking videos;
uploading the videos to the memory, editing the videos and producing a composite video for the real estate listing; and
wherein the camera tutorials comprise a "reveal/slide" tutorial directing a user first to stand still with feet sidewise apart in front of the first space, to hold the camera still, to align a horizontal view line in the display with a marker line, and then to move the user's body linearly sidewise left to right (or right to left) while taking a video of the first space.

11. A computer-implemented method for generating a video for a real estate listing comprising:
providing a real estate listing comprising at least a first space;
providing a mobile communication device comprising a camera, a display, a central processing unit (CPU), a video generating application and a memory;
starting the video generating application;
opening the camera and providing camera tutorials, wherein the camera tutorials comprise instructions for camera positioning, camera moving, and camera aligning while taking videos;
taking videos of the first space following the instructions for camera positioning, camera moving, and camera aligning while taking videos;
uploading the videos to the memory, editing the videos and producing a composite video for the real estate listing; and
wherein the camera tutorials comprise a "rotational" tutorial directing a user first to stand still with feet sidewise apart in front of the first space, to hold the camera still, to align a horizontal view line in the display with a marker line, and then to rotate the user's body left to right (or right to left) while taking a video of the first space.

12. A system for generating a video for a real estate listing comprising:
a mobile communication device comprising a camera, a display, a central processing unit (CPU), a video generating application and a memory;
wherein the mobile communication device is configured to connect to a video application server, an online data storage device, an authentication server and a global mapping server via a network connection;
wherein the video generating application is configured to provide a user interface via the display and comprises computer implemented instructions for opening the camera and providing camera tutorials, wherein the camera tutorials comprise instructions for camera positioning, camera moving, and camera aligning while taking videos;
wherein the video generating application further comprises computer implemented instructions for taking videos of a first space of a real estate listing according to the instructions of the camera tutorials; and
wherein the video generating application further comprises computer implemented instructions for uploading the videos to the memory, editing the videos and producing a composite video for the real estate listing;
wherein the camera tutorials comprise a "push in/push out" tutorial directing a user first to stand still with the user's left leg positioned forward in front of the first space, to hold the camera still, to align a horizontal view line in the display with a marker line, and then to put all the user's weight on the left front leg and to move the user's body forward (push-in) or backward (push-out) while taking a video of the first space.

13. The system of claim 12, wherein the video generating application further comprises a stabilization tool that stabilizes the videos.

14. The system of claim 12, wherein the real estate listing comprises additional spaces and wherein the video generating application further comprises computer implemented instructions for selecting a template mode or a custom mode and wherein the template mode provides one or more pre-arranged templates for arranging and presenting the videos of each space and wherein the custom mode provides a customizable arrangement and presentation of the videos of each space.

15. The system of claim 12, wherein the real estate listing comprises additional spaces and wherein the video generating application further comprises computer implemented instructions for providing one or more templates, selecting a template by the user and taking videos of each space of the real estate listing, wherein each template is configured to provide section information for each space of the real estate listing, a specific sequence arrangement of the spaces of the real estate listing, and specific music to accompany each video of each space of the real estate listing.

16. The system of claim 12, wherein the real estate listing comprises additional spaces and wherein the video generating application further comprises computer implemented instructions for entering section information for each space of the real estate listing, selecting specific music to accompany each video of each space of the real estate listing, taking videos of each space of the real estate listing and arranging the videos of each space in a custom order.

17. The system of claim 12, wherein the video generating application further comprises computer implemented instructions for previewing the videos of the first space and accepting them or retaking them.

18. The system of claim 12, wherein the first space comprises one of entrance, living room, dining room, kitchen, office, master bedroom, master bathroom, bedroom, bathroom, basement, attic, storage, backyard, frontyard, sideyard, deck, patio, and garden area.

19. The system of claim 12, wherein the real estate listing further comprises one or more of real estate listing type, location, house type, number of bedrooms, number of bathrooms, house area, lot area, additional structures and amenities.

20. The system of claim 12, the video generating application further comprises computer implemented instructions for entering one or more of a company logo, company name, company image, and company contact information.

21. The system of claim 12, wherein the mobile communication device comprises one of a tablet, a digital camera, a mobile phone, a laptop computer, or any other computing device with a camera.

22. A system for generating a video for a real estate listing comprising:
- a mobile communication device comprising a camera, a display, a central processing unit (CPU), a video generating application and a memory;
- wherein the mobile communication device is configured to connect to a video application server, an online data storage device, an authentication server and a global mapping server via a network connection;
- wherein the video generating application is configured to provide a user interface via the display and comprises computer implemented instructions for opening the camera and providing camera tutorials, wherein the camera tutorials comprise instructions for camera positioning, camera moving, and camera aligning while taking videos;
- wherein the video generating application further comprises computer implemented instructions for taking videos of a first space of a real estate listing according to the instructions of the camera tutorials;
- wherein the video generating application further comprises computer implemented instructions for uploading the videos to the memory, editing the videos and producing a composite video for the real estate listing; and
wherein the camera tutorials comprise a "reveal/slide" tutorial directing a user first to stand still with feet sidewise apart in front of the first space, to hold the camera still, to align a horizontal view line in the display with a marker line, and then to move the user's body linearly sidewise left to right (or right to left) while taking a video of the first space.

23. A system for generating a video for a real estate listing comprising:
- a mobile communication device comprising a camera, a display, a central processing unit (CPU), a video generating application and a memory
- wherein the mobile communication device is configured to connect to a video application server, an online data storage device, an authentication server and a global mapping server via a network connection;
- wherein the video generating application is configured to provide a user interface via the display and comprises computer implemented instructions for opening the camera and providing camera tutorials, wherein the camera tutorials comprise instructions for camera positioning, camera moving, and camera aligning while taking videos;
- wherein the video generating application further comprises computer implemented instructions for taking videos of a first space of a real estate listing according to the instructions of the camera tutorials;
- wherein the video generating application further comprises computer implemented instructions for uploading the videos to the memory, editing the videos and producing a composite video for the real estate listing; and
wherein the camera tutorials comprise a "rotational" tutorial directing a user first to stand still with feet sidewise apart in front of the first space, to hold the camera still, to align a horizontal view line in the display with a marker line, and then to rotate the user's body left to right (or right to left) while taking a video of the first space.

* * * * *